(12) United States Patent
Wu et al.

(10) Patent No.: US 8,995,539 B2
(45) Date of Patent: Mar. 31, 2015

(54) METHODS AND APPARATUS FOR SELECTING AND USING COMMUNICATIONS RESOURCES IN A COMMUNICATION SYSTEM

(75) Inventors: Xinzhou Wu, Monmouth Junction, NJ (US); Junyi Li, Chester, NJ (US); Sundar Subramanian, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 12/835,264

(22) Filed: Jul. 13, 2010

(65) Prior Publication Data
US 2012/0014463 A1    Jan. 19, 2012

(51) Int. Cl.
| H04K 1/10 | (2006.01) |
| H04L 5/00 | (2006.01) |
| H04L 27/26 | (2006.01) |
| H04W 72/12 | (2009.01) |

(52) U.S. Cl.
CPC .......... *H04L 5/003* (2013.01); *H04L 5/00* (2013.01); *H04L 5/0007* (2013.01); *H04L 27/2601* (2013.01); *H04W 72/1231* (2013.01)
USPC .......................................... 375/260; 375/132

(58) Field of Classification Search
USPC .......... 375/132, 137, 260, 295, 316; 370/204, 370/206, 210, 342, 329, 330
See application file for complete search history.

(56) References Cited

U.S. PATENT DOCUMENTS

| 5,166,924 A * | 11/1992 | Moose .......................... 370/289 |
| 5,771,224 A * | 6/1998 | Seki et al. ..................... 370/206 |
| 6,711,120 B1 * | 3/2004 | Laroia et al. .................. 370/204 |
| 7,092,353 B2 * | 8/2006 | Laroia et al. .................. 370/210 |
| 7,397,838 B2 * | 7/2008 | Laroia et al. .................. 375/132 |
| 7,729,329 B2 * | 6/2010 | Fujita et al. ................... 370/342 |

(Continued)

FOREIGN PATENT DOCUMENTS

| CN | 101577693 A | 11/2009 |
| GB | 2425024 A | 10/2006 |

(Continued)

OTHER PUBLICATIONS

International Search Report and Written Opinion—PCT/US2011/043899—ISA/EPO—Oct. 7, 2011.

(Continued)

*Primary Examiner* — Daniel Washburn
*Assistant Examiner* — Fitwi Hailegiorgis
(74) *Attorney, Agent, or Firm* — James K. O'Hare (57) ABSTRACT

Methods and apparatus for determining, e.g., selecting, communications resources, e.g., tones, to use in a communications system are described. The methods are well suited for use in Orthogonal Frequency Division Multiplexing (OFDM) systems. Devices seeking to transmit information select tones in pairs for use in transmitting the information. Each tone pair includes a tone and the corresponding image tone. By restricting a communications device to select communications frequencies in pairs, the problem of interference and reduced dynamic range at a receiver due to IQ imbalance is reduced, as compared to the case where devices may use a tone independent of the corresponding image tone for transmission purposes, since the path loss from the transmitter to the receiver is likely to be the same for both tones and the transmission power level is controlled by an individual device using both of the tones.

15 Claims, 8 Drawing Sheets

(56) References Cited

U.S. PATENT DOCUMENTS

| | | | |
|---|---|---|---|
| 7,983,356 B2* | 7/2011 | Chrabieh et al. | 375/295 |
| 2002/0196731 A1* | 12/2002 | Laroia et al. | 370/206 |
| 2005/0085265 A1* | 4/2005 | Laroia et al. | 455/560 |
| 2007/0009053 A1* | 1/2007 | Laroia et al. | 375/260 |
| 2007/0147228 A1 | 6/2007 | Kim et al. | |
| 2007/0165694 A1 | 7/2007 | Parizhsky et al. | |
| 2007/0263667 A1* | 11/2007 | Dubuc et al. | 370/500 |
| 2008/0212532 A1* | 9/2008 | Heo et al. | 370/330 |
| 2008/0298445 A1 | 12/2008 | Richardson et al. | |
| 2008/0310534 A1 | 12/2008 | Egashira et al. | |
| 2009/0161607 A1* | 6/2009 | Petersen | 370/329 |
| 2009/0279422 A1 | 11/2009 | Fonseka et al. | |
| 2009/0279588 A1* | 11/2009 | Mochizuki | 375/137 |
| 2009/0325516 A1* | 12/2009 | Safavi | 455/126 |
| 2011/0211655 A1* | 9/2011 | Wang et al. | 375/295 |

FOREIGN PATENT DOCUMENTS

| | | | |
|---|---|---|---|
| JP | 2007174679 A | 7/2007 | |
| JP | 2008312149 A | 12/2008 | |
| WO | WO9859450 A1 | 12/1998 | |
| WO | WO03001696 A2 | 1/2003 | |
| WO | WO2006052235 A1 | 5/2006 | |
| WO | WO 2009/124953 A1 * | 10/2009 | H04L 27/26 |
| WO | WO-2010056204 A2 | 5/2010 | |

OTHER PUBLICATIONS

Kadous T. et al., "D-Revision C Proposal White Paper", 3GPP2-Drafts, 2500 Wilson Boulevard, Suite 300, Arlington, Virginia 22201, USA, Jun. 15, 2009, pp. 1-28, XP040481833, 3GPP2 chapter 2.4.2 figure 6.

* cited by examiner

METHODS AND APPARATUS FOR SELECTING AND USING COMMUNICATIONS RESOURCES IN A COMMUNICATION SYSTEM

FIELD

Various embodiments relate to wireless communications, and more particularly, to methods and apparatus for determining, e.g., selecting, communications resources, e.g., tones, to use for transmission purposes.

BACKGROUND

In an OFDMA (Orthogonal Frequency Division Multiple Access) based system, the system frequency-time resources are often divided into small resource units which can be assigned to multiple different devices for transmission purposes. The smallest resource unit usually occupies one tone in the frequency domain and one OFDM-symbol in the time domain. Which tones devices in a communications system use for transmission purposes can have a significant effect on interference, e.g., interference caused by In-phase and Quadrature phase signal imbalance.

In-phase (I) and Quadrature phase (Q) signal imbalance, commonly referred to as IQ imbalance, occurs when the In-phase and Quadrature components are not fully symmetric, e.g., either in phase or in amplitude. IQ imbalance typically occurs both at the transmitter and at the receiver. In the case of single-tone transmissions by a transmitter, the IQ imbalance manifests itself as an image tone at frequency fc−f when an intended signal is sent at frequency fc+f by a transmitter, where $f_C$ is the frequency of the carrier signal used to modulate the baseband tone f. The image tone at frequency fc−f is an interference signal generated by the transmitter transmitting on tone fc+f. In other words, part of the energy transmitted on tone fc+f leaks to tone fc−f at the receiver. Due to the existence of this leakage, signaling or the traffic transmission in the system using frequency (fc−f), potentially transmitted from another communication device, can be corrupted. Although the leakage caused by the image tone may appear at a strength which is considerably lower than the signal on the original tone (fc+f), it can still be of considerable strength when compared to other transmissions on tone (fc−f), especially when the transmission on tone fc−f comes from another transmitter. If the problems caused by the image tone are left unmitigated, the achievable reliability of decoding/detection of signals may, and often is, reduced at a device trying to receive data on the image tone frequency. As we have discussed, this effect is more pronounced when the two baseband frequencies, e.g., (f, and −f) are simultaneously used by two different devices which are transmitting on the corresponding passband frequencies (fc+f and fc−f).

Figure 1:
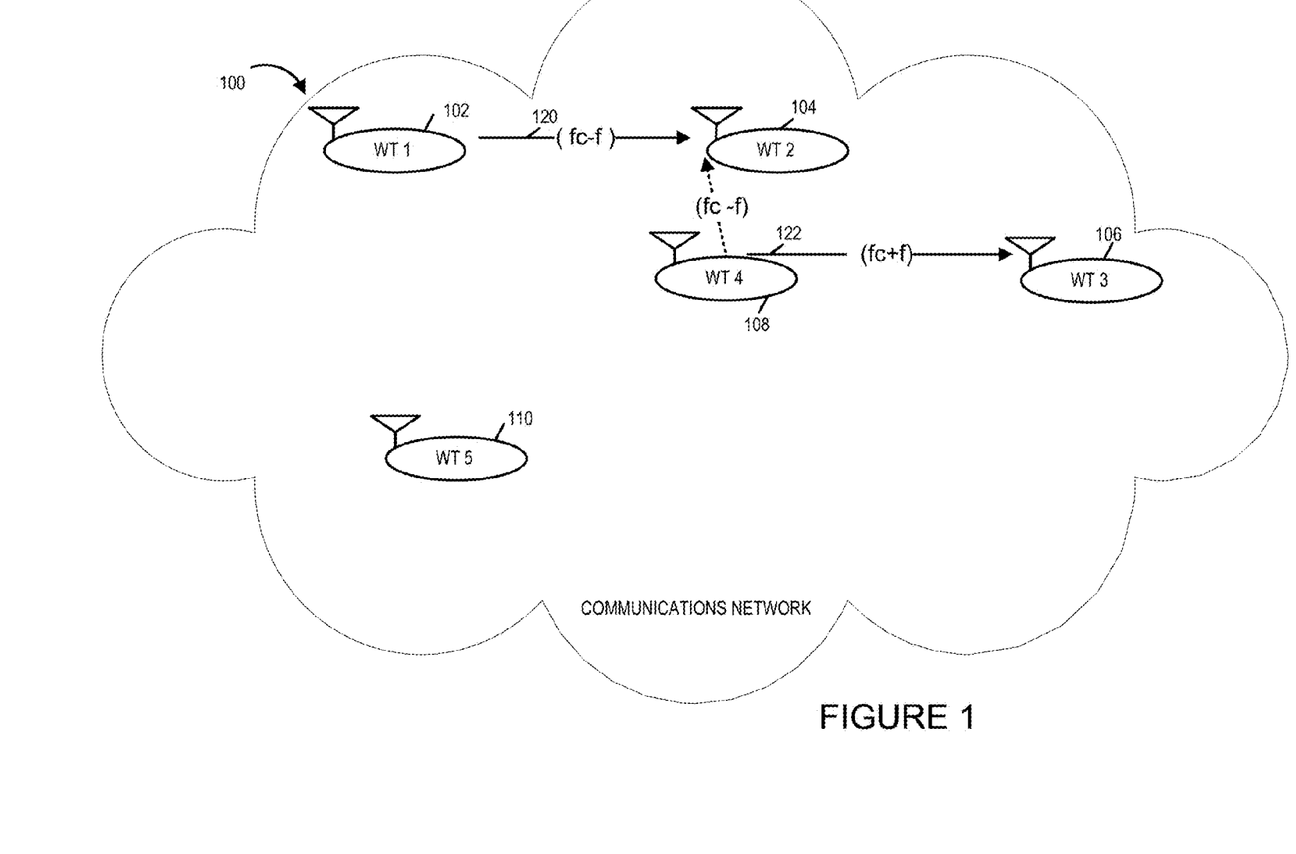
FIG. 1 is a drawing of a wireless communications system.

Consider a communications network 100 illustrated in FIG. 1. The network 100 includes a number of mobile wireless terminals including WT 1 102, WT 2 104, WT 3 106, WT 4 108 and WT 5 110. The wireless terminals 102 and 104 have an established communications link (WT 1 102 to WT 2 104). WT 1 102 transmits information to WT 2 104 using a frequency fc−f. However there is another simultaneous communications session going on where WT 4 108 transmits information to WT 3 106 using frequency fc+f over another communications link (WT 4 108 to WT 3 106). The WT 4 108 is physically in closer proximity of WT 2 104 than the WT 1 102. In such a scenario, the image frequency of fc+f appears at "fc−f" (at the receiving WT 2 104) and may strongly damage the information signal detection capability of WT 2 104. Furthermore, if WT 4 108 is much closer to WT 2 104 than WT 1 102 as shown in FIG. 1, e.g., with the pathloss from WT 4 108 to WT 1 102 being lower, the received signal due to the image tone generated by WT 4 108 can be comparable in strength or stronger than the information signal from WT 1 102 transmitted to WT 2 104 on the same tone (fc−f).

The interference caused by the image tones often results in a degradation of received signal quality at a receiver device WT 2 104, as the signals at any given frequency can be hidden under interference signals due to the existence of image tones from signals transmitted by unintended transmitters. In a system with a centralized controller, such as a cellular system where a base station or system controller controls tone assignments, interference can be mitigated by controlling the transmit power of different signals at different tones by taking into consideration the interference which will be caused by the assignment of tones to particular devices in the overall system.

In an ad hoc network, a centralized controller which controls tone assignments and transmit power in the system is normally lacking and the problem of interference due to the generation of image tones can be significant. Thus, it should be appreciated that the problem of interference caused by I/Q imbalance can be more damaging in an ad hoc network due to the arbitrary location of wireless terminals and lack of the central coordination device such as a base station.

In view of the above, it should be appreciated that there is a need for methods and apparatus that allow for the determination of what communications resources, e.g., tones, should be used that would reduce, avoid or mitigate the problem of dynamic range reduction at receivers due to interference caused by the generation of image tones. It would be desirable if the methods and/or apparatus were suitable for use in ad hoc networks where a centralized controller is not available for controlling tone allocation to different devices in the system.

SUMMARY

Methods and apparatus for determining, e.g., selecting, communications resources to use in a communications system are described. The communications resources maybe, e.g., frequencies in the form of tones. The methods and apparatus are well suited for use in Orthogonal Frequency Division Multiplexing (OFDM) systems where information may be transmitted on OFDM tone-symbols. In such a system a transmitted OFDM symbol may include signal energy placed on various tone-symbols in the OFDM symbol where the tone-symbols correspond to tones selected for use by the communications device.

In accordance with one embodiment, devices seeking to transmit information select tones in pairs for use in transmitting the information. Thus, when a transmitting device selects a frequency of a tone to use for transmission purposes it also selects the frequency of the corresponding image tone to use. Individual devices select one or more tone pairs to use for communications purposes. By restricting a communications device to selecting communications frequencies in pairs, e.g., a tone and its image tone, the problem of interference and reduced dynamic range at a receiver due to IQ imbalance is reduced as compared to the case where devices may use a tone independent of the corresponding image tone for transmission purposes. Since a single device uses both the tone and the image tone, the risk that the leakage from the signal transmitted on the tone to the image tone will overwhelm the signal transmitted on the image tone frequency is avoided since the path loss from the transmitter to the receiver is likely to be the same for both tones and the transmission power level is controlled by an individual device using both of the tones.

In various embodiments, communications devices communicate, e.g., transmit/receive, on a set of communications resources, e.g., OFDM tones or frequencies, available in an OFDM symbol. The frequencies are used in pairs.

Nearby devices prefer, and commonly do, use different tone pairs for communications to avoid interference between each other. In some embodiments where a centralized controller does not exist, e.g., ad hoc embodiments, different devices select frequencies, e.g., tone-symbols, to use for communications purposes in a distributed manner. In accordance with one feature of various embodiments, in order to prevent or reduce the possibility of an image tone (e.g., −f1) appearing stronger than an intentionally transmitted signal at the frequency (f1) as noted above tone selection is made by selecting pairs of tone frequencies to use, e.g. frequencies (f1 and −f1) are treated as a tone pair and a device selects the pair of frequencies to use for transmission purposes. In such an embodiment the transmitting device will transmit information using both frequencies f1 and −f1 during a given transmission time period, e.g., by transmitting on tones corresponding to (fc+f1 and fc−f1), where fc is the carrier frequency, during the same symbol transmission time period.

The principle of selecting a frequency tone and its image frequency tone as a resource allocation unit in wireless networks may apply to both control channels and data transmission channels. In some embodiments, multiple transmitters are only allowed to transmit in the control channels, e.g., paging channel, peer discovery channel and connection scheduling channels. In this case, each device only has to select frequency resources based on the frequency pair unit in control channels. An exemplary method for selection is to let each device first monitor the usage of tone-pairs in its interference neighborhood. A device will pick the tone-pair which is not being used by any other device (or connection) in its neighborhood to avoid collision.

An exemplary method of operating a wireless communications device, in accordance with some embodiments, comprises: determining, e.g., selecting, a first set of frequency pairs in a first OFDM symbol to use simultaneously for transmission purposes, said first set of frequency pairs including a first tone at a first frequency and a second tone at a second frequency which is an image frequency of said first frequency; and transmitting information in said first OFDM symbol using only said determined first set of frequency pairs. As should be appreciated, the first set of frequency pairs may include a singe pair of frequencies. However, in cases where a significant amount of data is to be transmitted the first set of frequency pairs may include multiple pairs of frequencies. In some embodiments where multiple frequency pairs are selected, some frequency pairs which are not selected may be interspaced in terms of frequency with the selected frequency pairs. Thus it should be appreciated that while frequency pairs may comprise sets of adjacent tones above the carrier frequency and below the carrier frequency, all of the tones need not be adjacent in terms of frequency.

An exemplary wireless communications device, in accordance with some embodiments, comprises at least one processor configured to: determine, e.g., select, a first set of frequency pairs in a first OFDM symbol to use simultaneously for transmission purposes, said first set of frequency pairs including a first tone at a first frequency and a second tone at a second frequency which is an image frequency of said first frequency, and transmit information in said first OFDM symbol using only said determined first set of frequency pairs.

While described in the context of an ad hoc network, it should be appreciated that the frequency pair based tone selection method may be employed in system with centralized controllers and/or other types of systems as well.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 2:
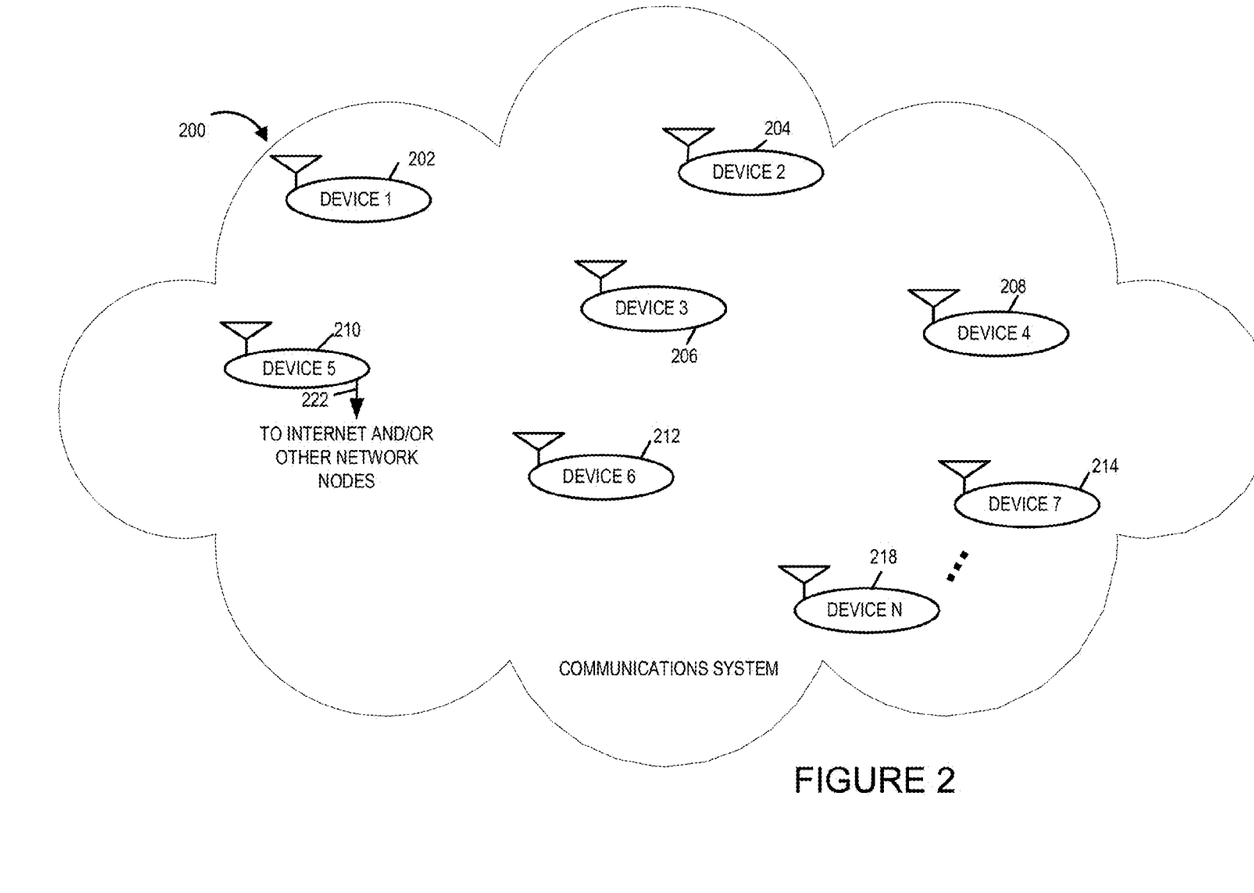
FIG. 2 illustrates a communications system in accordance with one exemplary embodiment.

FIG. 2 illustrates an exemplary wireless peer to peer communications system 200 in accordance with an exemplary embodiment. Exemplary wireless peer to peer communications system 200 includes a plurality of wireless communications devices (device 1 202, device 2 204, device 3 206, device 4 208, device 5 210, device 6 212, device 7 214, . . . , device N 218. Some of the wireless communications devices in system 200, e.g., device 5 210, include an interface 222, to the Internet and/or other network nodes. Some of the wireless communications devices in system 200, e.g., device 1 202, device 2 204, device 3 206, device 4 208, device 6 212, device 7 214, and device N 218, are mobile wireless communications devices, e.g., handheld mobile devices.

The communications devices (202, 204, 206, 208, . . . , 218) support various signaling between peers, e.g., peer discovery signals, pilot signals, transmission request signals, etc., and data transmissions between peers.

Figure 3:
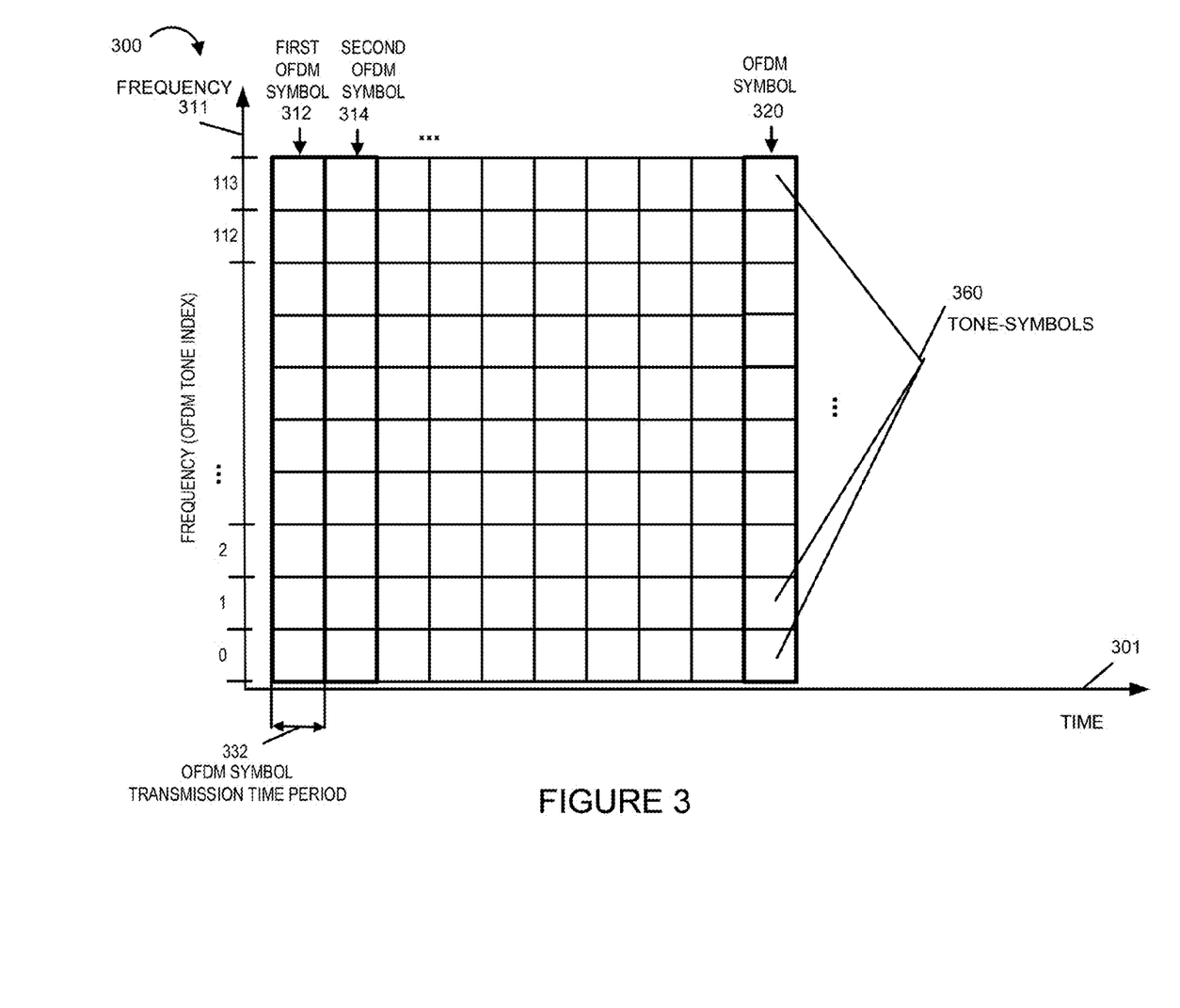
FIG. 3 illustrates exemplary air link communications resources which can be used to communicate information.

FIG. 3 is a drawing 300 illustrating exemplary communications resources, e.g., time-frequency resources, which can be used, for example, to communicate information by one or more devices in the system 200. Consider an exemplary embodiment of a frequency division multiplexing system, e.g., an OFDM system. In one such system, information may be transmitted in a symbol-by-symbol manner. In one such embodiment during a symbol transmission period, available bandwidth (frequency) is divided into a number of tones, each of which can be used to carry information.

In FIG. 3, the horizontal axis 301 represents time and the vertical axis 311 represents frequency. A vertical column represents an OFDM symbol having a duration corresponding to one symbol transmission time period. A plurality of OFDM symbols, e.g., a first OFDM symbol 312, second OFDM symbol 314, and OFDM symbol 320 are shown. Each of the OFDM symbols includes multiple tones (frequencies) corresponding to a given symbol transmission time period. The OFDM symbol transmission time period identified by reference number corresponds to the time used to transmit one OFDM symbol. In some embodiments, an OFDM symbol includes 113 tones. However different embodiments use other number of tones. Each small box 360 represents a tone-symbol, which is the air link resource of a single tone over a symbol transmission time period. Each of the individual tone-symbols 360 is a communications resource and has a frequency and time period associated with it as should be appreciated from the figure.

Communications devices communicate with each other using one or more communications resources, e.g., the tone-symbols. In an exemplary peer to peer communications system such as system 200, a pair of peer to peer communications devices which seeks to communicate, monitors communications resources to determine which resources the devices can use for communications purposes, e.g., frequencies not being used by other devices. During the establishment of a communications session, the pair of communications devices agrees on one or more tone-symbols which the communications devices may use for transmitting and receiving information. Thus after determining, the peer communications devices which seek to communicate are aware of the selected tone-symbols or frequencies that they will use for transmitting and/or receiving information from each other.

In accordance with one aspect, a communications device 202 determines a first set of frequency pairs in a first OFDM symbol to use simultaneously for transmission purposes, the first set of frequency pairs including a first tone at a first frequency and a second tone at a second frequency which is an image frequency of said first frequency. Said determination may be based on the connection identifier corresponding to the connection between the two peers or the device identifier corresponding to a peer. A pair of peer communications devices (e.g., devices 202, 204) which seek to communicate may get the same connection identifier, and thus such a pair of communications devices would know the frequency pairs on which to transmit or receive form each other. In some other embodiments device 1 202 determines the set of frequency pairs to use simultaneously for transmission, and communicate the identification information regarding the determined set of frequency pairs to the device 2 204 so that the peer device 2 204 may know where to receive the information transmitted by peer device 1 202.

Figure 4:
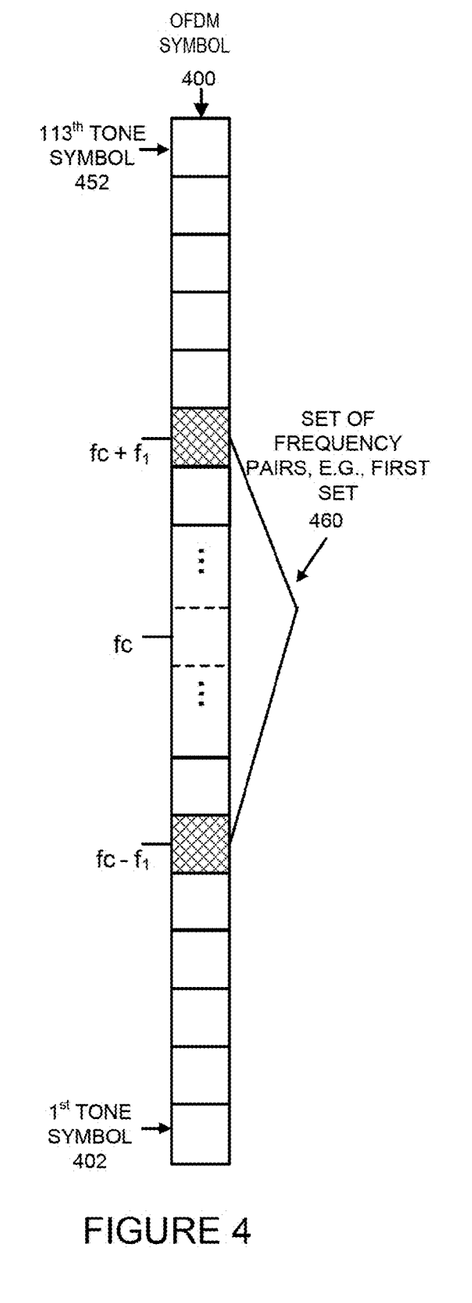
FIG. 4 illustrates an exemplary OFDM symbol including plurality of tone-symbols, in accordance with an exemplary embodiment.

FIG. 4 is used to explain how communications resources, e.g., OFDM tone-symbols, form different frequency pairs. FIG. 4 illustrates an exemplary OFDM symbol, e.g., first OFDM symbol 400, and distribution of communications resources therein, e.g., distribution of individual tone-symbols, included in the exemplary OFDM symbol 400. Although in the FIG. 4 example, OFDM symbol 400 is discussed as a first OFDM symbol, it should be appreciated that the OFDM symbol 400 can be any one of the OFDM symbols 312, 314, . . . , 320, shown in FIG. 3.

As shown in FIG. 4, the OFDM symbol 400 includes 113 tone-symbols, e.g., $1^{st}$ tone-symbol 402, . . . , $113^{th}$ tone symbol 452. In accordance with one aspect, a frequency pair corresponds to a pair of tone-symbols or tones. A pair of tones include a first tone at first frequency, e.g., fc+f1, and another tone at its image frequency, e.g., fc−f1, where fc is the carrier signal frequency used to modulate a baseband tone, e.g., f1, and thus producing a tone at frequency fc+f1. For example, the OFDM symbol 400 includes a first set of frequency pairs 460, where the first set includes frequency pair (fc+f1, and fc−f1). In accordance with one feature of an exemplary embodiment, a communication device can determine a set of frequency pairs such as the first set frequency pairs 460 in the OFDM symbol 400, to use simultaneously for transmission purposes. In FIG. 4 cross hatching is used to indicate frequency pairs included in the first set of frequency pairs 460. The remaining tone-symbols in the OFDM symbol 400 are not shaded/cross hatched to distinguish them from tone-symbols corresponding to the frequency pairs in the first set 460. Although in FIG. 4 example, the first set of frequency pairs 460 is shown to include a single tone-symbol pair which forms the frequency pair (fc+f1, and fc−f1) for simplifying the illustration, it should however be appreciated that the first set of frequency pairs 460 may include a plurality of frequency pairs in some embodiments.

Figure 5:
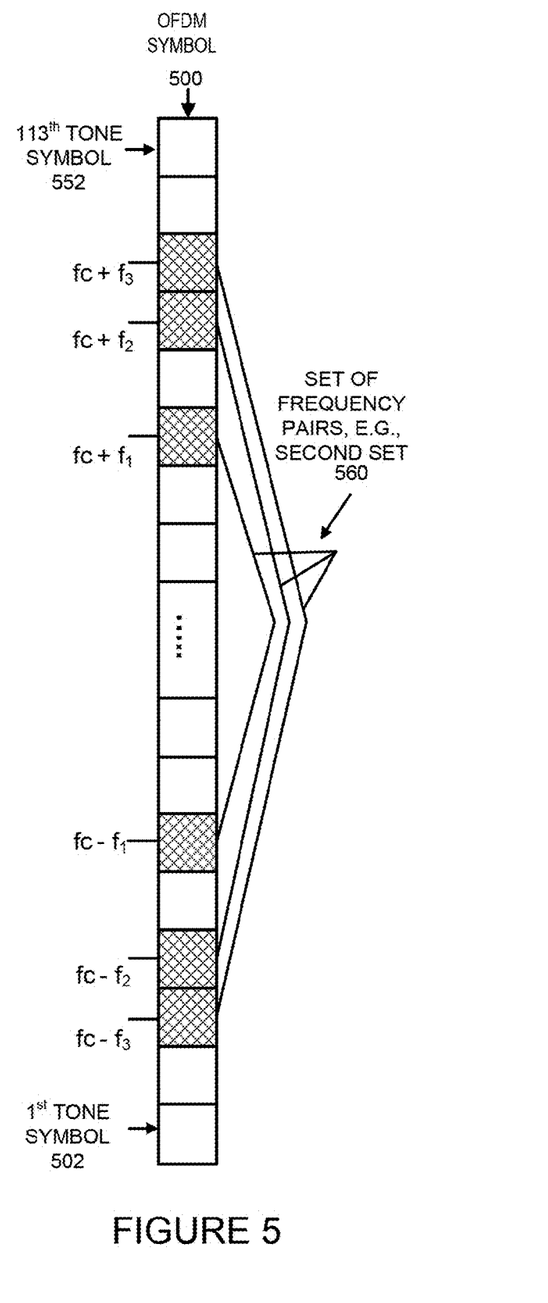
FIG. 5 illustrates another exemplary OFDM symbol including various tone-symbols, in accordance with an exemplary embodiment.

FIG. 5 shows another example illustrating an exemplary OFDM symbol 500, e.g., a second OFDM symbol, and arrangement of communications resources therein, in accordance with an exemplary embodiment. Although in the FIG. 5 example, OFDM symbol 500 is discussed as a second OFDM symbol, it should be appreciated that the OFDM-symbol 500 can be any one of the OFDM symbols 312, 314, . . . , 320, shown in FIG. 3.

As shown in FIG. 5, the exemplary second OFDM symbol 500 includes a plurality of individual tone-symbols. As illustrated, the second OFDM symbol 500 includes 113 tone-symbols, e.g., $1^{st}$ tone-symbol 502, . . . , $113^{th}$ tone symbol 552. In the FIG. 5 example, a set of frequency pairs, e.g., second set of frequency pairs 560, includes a plurality of tone-symbol pairs, e.g., 3 frequency pairs. The second set of frequency pairs 560 includes a first, a second and a third frequency pair. The first frequency pair having a tone at frequency fc+f1 and another tone at its image frequency fc−f1, the second frequency pair having a tone at frequency fc+f2 and another tone at its image frequency fc−f2, and the third frequency pair in the second set having a third tone at a third frequency fc+f3 and a fourth tone at a fourth frequency fc−f3 which is an image frequency of the third frequency. Thus, it should be appreciated that in some embodiments a set of frequency pairs such as second set of frequency pairs 560 can include multiple frequency pairs. It should be further appreciated that in some embodiments a single device determines the frequency pairs included in the second set of frequency pairs 560 to use simultaneously for communications purposes, e.g., for transmitting information to or receiving from a communications peer in a peer to peer communications session.

Figure 6:
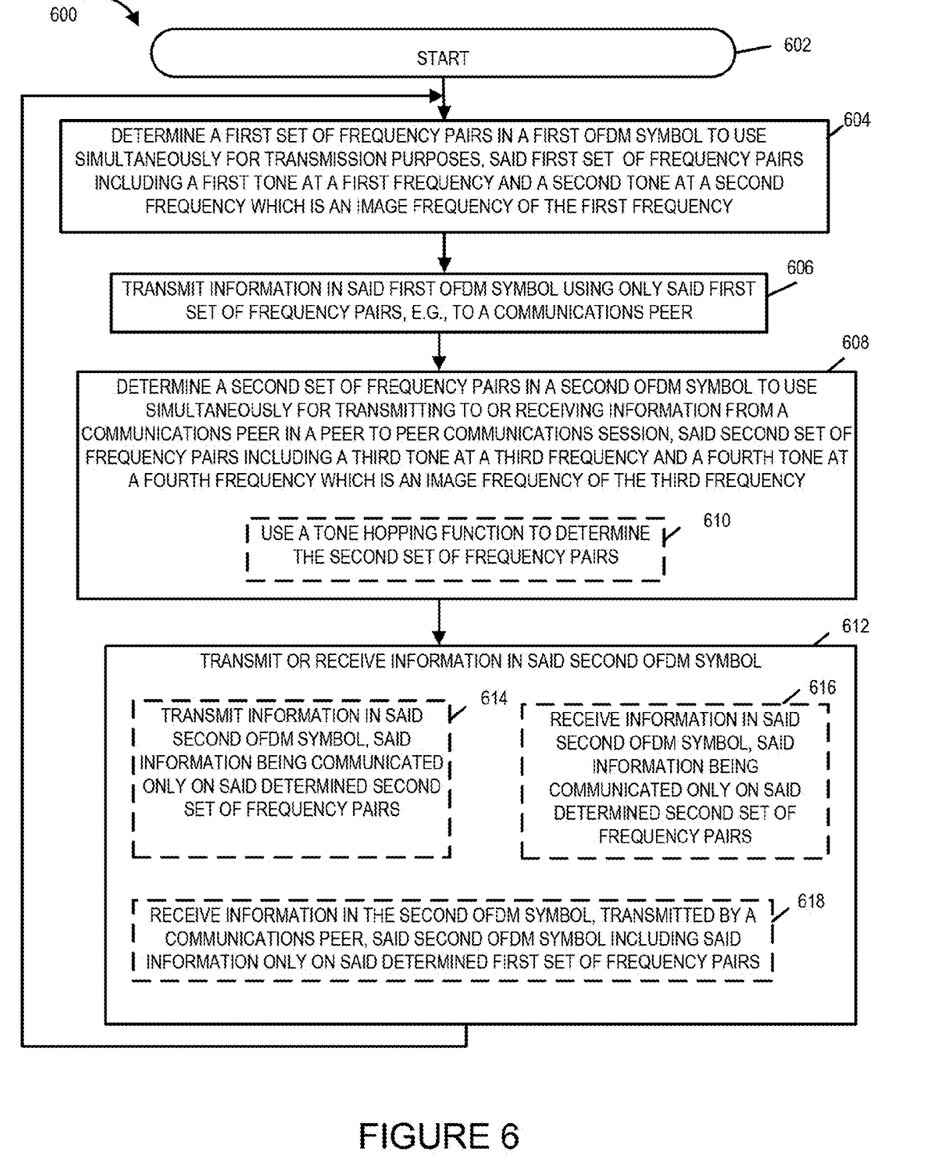
FIG. 6 is a flowchart illustrating an exemplary communications method in accordance with an exemplary embodiment.

FIG. 6 is a flowchart 600 illustrating the steps of an exemplary method of operating a wireless communications device, e.g., a peer to peer mobile node, in accordance with various exemplary embodiments. Although the exemplary wireless communications device could be, e.g., any of the wireless communications devices of peer to peer wireless communications system 200 of FIG. 2, however for the purpose of illustration, it is assumed that the wireless communications device is device 1 202. One or more of the steps in flowchart 600, indicated by dashed lines, are optional and are performed in some embodiments, while skipped in other embodiments. The exemplary method of flowchart 600 includes determining frequency pairs in an OFDM symbol for use in communications.

Operation of the exemplary method starts in step 602, where the wireless communications device is powered on and initialized. Operation proceeds from start step 602 to step 604. In step 604 the wireless communications device determines a first set of frequency pairs, e.g., first set 460, in a first OFDM symbol to use simultaneously for transmission purposes, said first set of frequency pairs including a first tone at a first frequency, e.g., fc+f1, and a second tone at a second frequency, e.g., fc−f1, which is an image frequency of said first frequency. Determining the first set of communications resources, i.e., the frequency pairs, is normally performed as part of a communications establishment session where one or more communications devices monitor communications resources and identify resources which are least affected by interference or noise, for use in communications. Some interference mitigation mechanism and at some level of coordination may be employed in the system to reduce the possibility of two different transmitting devices selecting the same sets of frequencies at the same time.

In some embodiments during the communications establishment session the communicating peer devices (communications peers) determine and agree on the frequency pairs to be used for communications purposes, e.g., before starting to transmit or receive. In some other embodiments, the communications device 202 communicates information indicating the determined first set of frequency pairs 460 to be used by device 202 simultaneously for transmission, to a communications peer with which the device 202 seeks to communicate. The information indicating the frequency pairs may be, e.g., resource identifiers corresponding to the determined frequency pairs.

Operation proceeds from step 604 to step 606. In step 606 the wireless communications device 202 transmits information, e.g., to a communications peer such as communications device 204, in the first OFDM symbol 400 using only the determined first set of frequency pairs 460. Operation proceeds from step 606 to step 608. In step 608 the communications device 202 determines a second set of frequency pairs in a second OFDM symbol, e.g., second set 560, to use simultaneously for transmitting to or receiving information from a communications peer in a peer to peer communications session, said second set of frequency pairs including a third tone at a third frequency and a fourth tone at a fourth frequency which is an image frequency of said third frequency. In some embodiments step 608 includes step 610 which is performed when tone hopping is implemented. In step 610, a tone hopping function is used to determine the second set of frequency pairs 560 in the second OFDM symbol 500. The tone hopping function is, e.g., a predetermined pattern, known to the communications devices in the system 200. Thus when tone hopping is implemented, the devices in system 200 can determine, using the tone hopping function, how the tones are being hopped from one OFDM symbol to another OFDM symbol.

In some embodiments the third tone at a third frequency is same as the first tone at the first frequency, and the fourth frequency is same as the second frequency, but in a different OFDM symbol, e.g., the second OFDM symbol. However in some embodiments the third tone at a third frequency is different from the first tone at the first frequency, and the fourth frequency is different from the second frequency. This may occur for example, when tone hopping is implemented and the first tone in the first OFDM symbol 400 is hopped to a third tone at third frequency in the second OFDM symbol, and the second tone in the first OFDM symbol 400 is hopped to a fourth tone at the fourth frequency in the second OFDM symbol.

Operation proceeds from step 608 which includes step 610, to step 612. In step 612 the communications device 202 transmits or receives information in the second OFDM symbol. Step 612 includes steps 614, 616 and 618, at least one of which is performed depending on the embodiment, as part of performing the step 612. Thus in some embodiments the communications device 202, in step 614 transmits information in the second OFDM symbol, said information being communicated only on the determined second set of frequency pairs. In some embodiments when step 616 is performed, the device 202 receives information in the second OFDM symbol, said information being communicated only on the determined second set of frequency pairs, e.g., from a peer communications device. Alternatively in some embodiments step 618 is performed wherein the device 202 receives information in the second OFDM symbol, transmitted by a communications peer, the second OFDM symbol including said information only on the determined first set of frequency pairs. For example, step 618 may be performed e.g., when tone hopping is not implemented, and the device 202 receives information on the determined first set of frequency pairs occurring in the second OFDM symbol. Operation proceeds from step 612 back to step 604. While steps 608 and step 612 are shown in the FIG. 6 embodiment, these steps may not be used in other embodiments and can therefore be considered optional in at least some embodiments.

Figure 7:
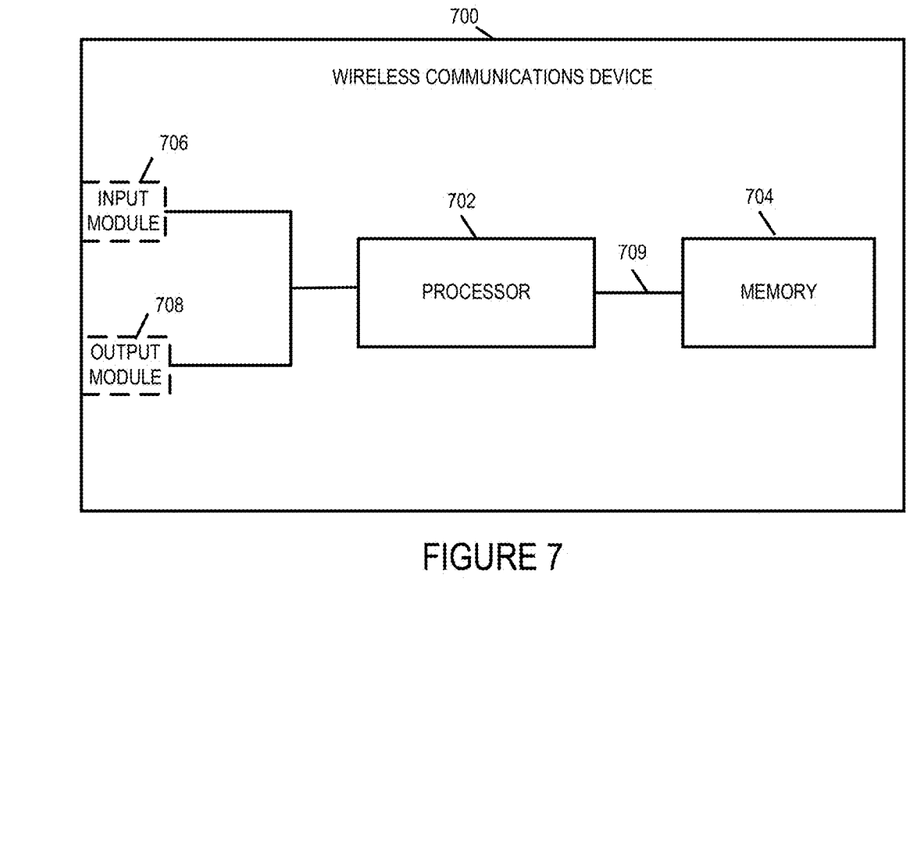
FIG. 7 is a drawing illustrating an exemplary peer to peer communications device, implemented in accordance with one exemplary embodiment.

FIG. 7 illustrates an exemplary wireless communications device 700, in accordance with an exemplary embodiment. Exemplary wireless communications device 700 is, e.g., one of the wireless communications devices of FIG. 2. Exemplary communications device 700 may be, and in at least one embodiment is, a mobile wireless terminal supporting peer to peer communications and implementing a method in accordance with flowchart 600 of FIG. 6.

Wireless communications device 700 includes a processor 702 and memory 704 coupled together via a bus 709 over which the various elements (702, 704) may exchange data and information. Communications device 700 further includes an input module 706 and an output module 708 which may be coupled to processor 702 as shown. However, in some embodiments, the input module 706 and output module 708 are located internal to the processor 702. Input module 706 can receive input signals. Input module 706 can, and in some embodiments does, include a wireless receiver and/or a wired or optical input interface for receiving input. Output module 708 may include, and in some embodiments does include, a wireless transmitter and/or a wired or optical output interface for transmitting output.

Processor 702 is configured to determine a first set of frequency pairs in a first OFDM symbol to use simultaneously for transmission purposes, said first set of frequency pairs including a first tone at a first frequency and a second tone at a second frequency which is an image frequency of said first frequency, and transmit information in said first OFDM symbol using only said determined first set of frequency pairs. In various embodiments the processor 702 is further configured to receive information in a second OFDM symbol transmitted by a communications peer, said second OFDM symbol including said information only on said first set of frequency pairs.

The processor 702 is further configured to determine a second set of frequency pairs in a second OFDM symbol to use simultaneously for receiving information from a communications peer in a peer to peer communications session, said second set of frequency pairs including a third tone at a third frequency and a fourth tone at a fourth frequency which is an image frequency of said third frequency, and receive information in said second OFDM symbol, said information being communicated only on said determined second set of frequency pairs. In some embodiments the processor 702 is further configured to use a tone hopping function to determine said second set of frequency pairs. The tone hopping function is, e.g., a predetermined pattern, known to the communications devices in the system 200.

The processor 702 in various embodiments is configured to determine a second set of frequency pairs in a second OFDM symbol to use simultaneously for transmitting information to a communications peer in a peer to peer communications session, the second set of frequency pairs including a third tone at a third frequency and a fourth tone at a fourth frequency which is an image frequency of said third frequency, and transmit information in said second OFDM symbol, said information being communicated only on said determined second set of frequency pairs. In some such embodiments the processor 702 is further configured to use a tone hopping function to determine said second set of frequency pairs.

Figure 8:
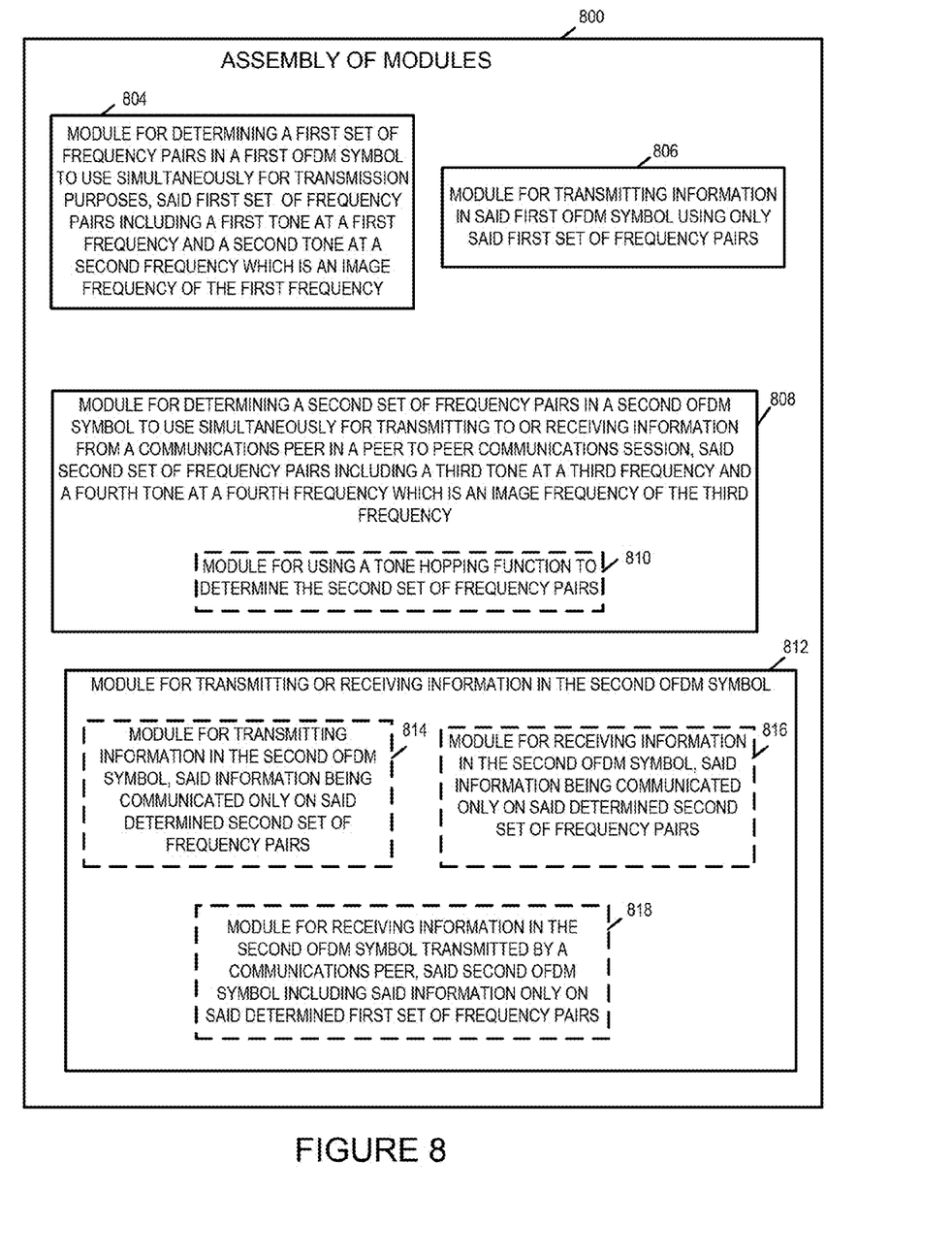
FIG. 8 illustrates an assembly of modules which can, and in some embodiments is, used in the wireless communications device illustrated in FIG. 7.

FIG. 8 illustrates an assembly of modules 800 which can, and in some embodiments is, used in the communications device 700 illustrated in FIG. 7. The modules in the assembly 800 can be implemented in hardware within the processor 702 of FIG. 7, e.g., as individual circuits. Alternatively, the modules may be implemented in software and stored in the memory 704 of the wireless terminal 700 shown in FIG. 7. While shown in the FIG. 7 embodiment as a single processor, e.g., computer, it should be appreciated that the processor 702 may be implemented as one or more processors, e.g., computers. When implemented in software the modules include code, which when executed by the processor, configure the processor, e.g., computer, 702 to implement the function corresponding to the module. In some embodiments, processor 702 is configured to implement each of the modules of the assembly of modules 800. In embodiments where the assembly of modules 800 is stored in the memory 704, the memory 704 is a computer program product comprising a computer readable medium comprising code, e.g., individual code for each module, for causing at least one computer, e.g., processor 702, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 8 control and/or configure the wireless terminal 700 or elements therein such as the processor 702, to perform the functions of the corresponding steps illustrated and/or described in the method of flowchart 600 of FIG. 6.

The assembly of modules 800 includes a module corresponding to each step of the method of flowchart 600 shown in FIG. 6. The module in FIG. 8 which performs or controls the processor 702 to perform a corresponding step shown in flowchart 600 is identified with a number beginning with an 8 instead of beginning with 6. For example module 804 corresponds to step 604 and is responsible for performing the operation described with regard to step 604. Assembly of modules 800 includes a module 804 for determining a first set of frequency pairs in a first OFDM symbol, e.g., first set 460, to use simultaneously for transmission purposes, said first set of frequency pairs including a first tone at a first frequency and a second tone at a second frequency which is an image frequency of said first frequency, a module 806 for transmitting information in said first OFDM symbol using only said determined first set of frequency pairs.

The assembly of modules 800 further includes a module 808 for determining a second set of frequency pairs in a second OFDM symbol to use simultaneously for transmitting to or receiving information from, a communications peer in a peer to peer communications session, said second set of frequency pairs including a third tone at a third frequency and a fourth tone at a fourth frequency which is an image frequency of said third frequency. In some embodiments the module 808 further includes a module 810 for using a tone hopping function to determine the second set of frequency pairs. In some embodiments the information regarding the tone hopping function may be, e.g., stored in the memory of the communications device 700.

The assembly of modules 800 further includes a module 812 for transmitting or receiving information in the second OFDM symbol. The module 812 can be implemented, e.g., as a transceiver module. The module 812 includes a module 814 for transmitting information in the second OFDM symbol, said information being communicated only on the determined second set of frequency pairs, a module 816 for receiving information in the second OFDM symbol, said information being communicated only on the determined second set of frequency pairs, and a module 818 for receiving information in the second OFDM symbol, transmitted by a peer communications device, said second OFDM symbol including said information only on said determined first set of frequency pairs.

The modules shown in dashed line boxes, e.g., modules 814, 816, 818, are optional, and thus one or more of these modules may be present in some embodiments while not in others. The dashed boxes indicate that although these modules are included in the assembly of modules 800 in various embodiments, the processor 702 may execute such an optional module in embodiments where the step to which these modules correspond, is performed. In some embodiments, one or more modules shown in FIG. 8 which are included within another module may be implemented as an independent module or modules.

Figure 9:
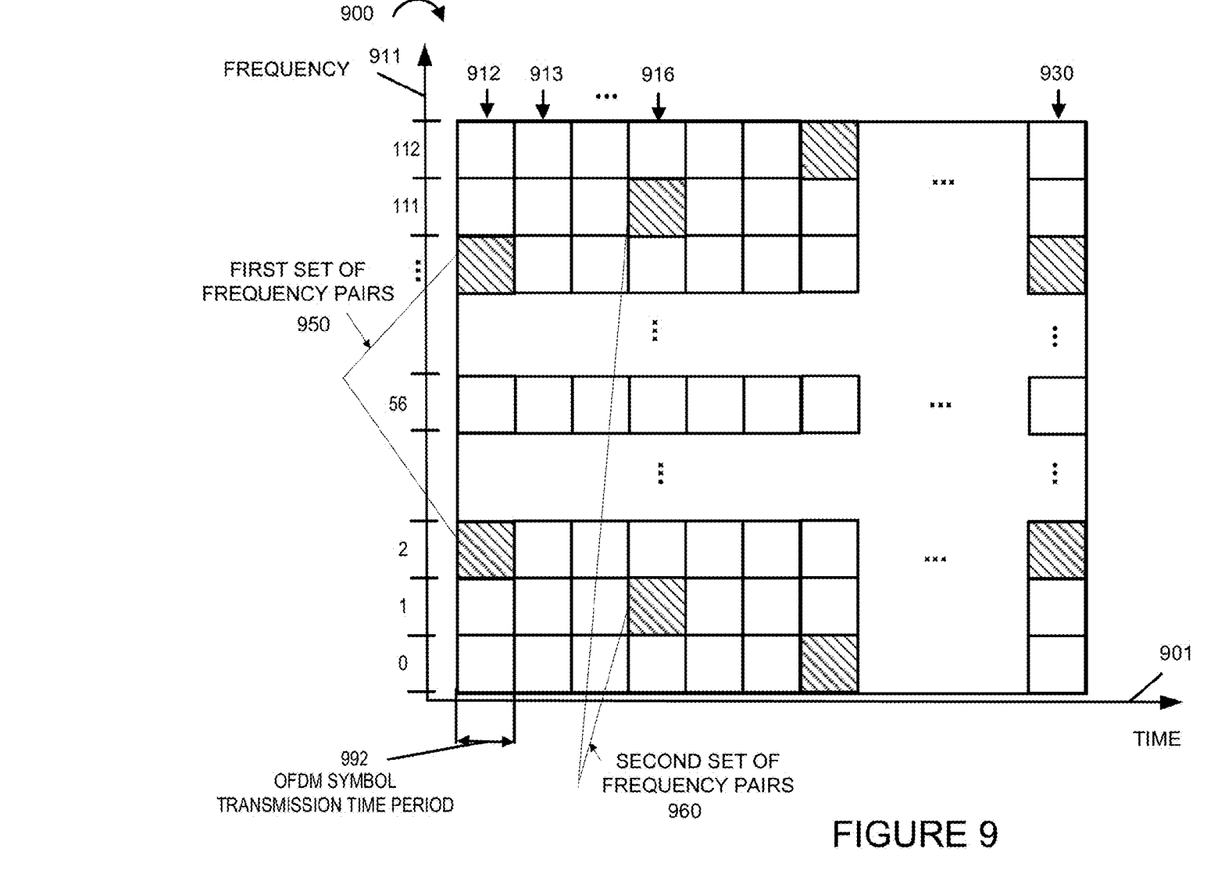
FIG. 9 illustrates an exemplary OFDM time frequency grid showing time-frequency resources, where tone hopping is used, in accordance with one exemplary embodiment.

FIG. 9 is a drawing 900 illustrating an exemplary OFDM channel represented as a time frequency grid, including time-frequency resources, where the tone hopping is implemented, in accordance with a tone hopping function. As shown horizontal axis 901 represents time and the vertical axis 911 represents frequency. Each vertical column represents an OFDM symbol having a duration corresponding to one symbol transmission time period. As discussed with regard to FIG. 3 example, during a symbol transmission period, available bandwidth (frequency) is divided into a number of tones (each small box represents a tone-symbol), each of which can be used to carry information.

In accordance with various embodiments a device determines a first set of frequency pairs 950 (tone-symbol pairs) in a first OFDM symbol, e.g., symbol 912, to use simultaneously for transmission purposes, said first set of frequency pairs including a first tone at a first frequency and a second tone at a second frequency which is an image frequency of said first frequency. When frequency hopping is used in the system, in accordance with various embodiments, a determined set of frequency pairs hops with time from symbol to symbol. Thus in some such embodiments, to determine a second set of frequency pairs in a second OFDM symbol, e.g., second set 960 in OFDM symbol 916, to use simultaneously for transmitting to or receiving information from a communications peer in a peer to peer communications session, the device uses a tone hopping function to determine said second set of frequency pairs 960. The second set of frequency pairs 960 includes a third tone at a third frequency and a fourth tone at a fourth frequency which is an image frequency of said third frequency. In some embodiments the tone hopping function is known to the devices in the system 200. It should be appreciated that the frequency hopping pattern shown in the FIG. 9 is just exemplary, and various other variations of the frequency hopping pattern according to different frequency hopping functions being used, are possible.

In accordance with various features, in a communications system such as system 200 where devices identify and use available frequency resources for communications purposes, the following measures, in some embodiments, are taken:

1. When a band of frequencies are selected by a communications device for user, a tone and its image tone are selected together by the same communications device.

2. In a frequency hopped system where the frequency is hopped with time, the image frequency is also synchronously hopped with the original tone.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, frequency pair determination, signal transmission and/or reception steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more exemplary methods.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless terminal, the method comprising:

selecting, at the wireless terminal and for use with a communications peer in a peer to peer communications session, a first set of frequency pairs in a first OFDM symbol to use simultaneously for transmission purposes, each individual frequency pair in said first set of frequency pairs including a pair of tones with one of the tones in the individual frequency pair being at the image frequency of the other tone in the individual frequency pair, said first set of frequency pairs including at least a first tone at a first frequency and a second tone at a second frequency which is an image frequency of said first frequency;

transmitting, at the wireless terminal, information in said first OFDM symbol using only said selected first set of frequency pairs;

selecting a second set of frequency pairs in a second OFDM symbol to use simultaneously for receiving information from a communications peer in a peer to peer communications session, each individual frequency pair in said second set of frequency pairs including a pair of tones with one of the tones in the individual frequency pair being at the image frequency of the other tone in the individual frequency pair, said second set of frequency pairs including a third tone at a third frequency and a fourth tone at a fourth frequency which is an image frequency of said third frequency; and receiving information in said second OFDM symbol, said information being communicated only on said selected second set of frequency pairs.

2. The method of claim 1,
wherein said first set of frequency pairs includes less than all of the frequency pairs in said first OFDM symbol.

3. The method of claim 1,
wherein said selecting said second set of frequency pairs includes using a tone hopping function to select said second set of frequency pairs.

4. The method of claim 1,
wherein said selection is based on a connection identifier or a device identifier.

5. A wireless terminal, comprising:
means for selecting, at the wireless terminal and for use with a communications peer in a peer to peer communications session, a first set of frequency pairs in a first OFDM symbol to use simultaneously for transmission purposes, each individual frequency pair in said first set of frequency pairs including a pair of tones with one of the tones in the individual frequency pair being at the image frequency of the other tone in the individual frequency pair, said first set of frequency pairs including at least a first tone at a first frequency and a second tone at a second frequency which is an image frequency of said first frequency;

means, implemented in hardware, for wirelessly transmitting, at the wireless terminal, information in said first OFDM symbol using only said selected first set of frequency pairs;

means, implemented in hardware, for selecting a second set of frequency pairs in a second OFDM symbol to use simultaneously for receiving information from a communications peer in a peer to peer communications session, each individual frequency pair in said second set of frequency pairs including a pair of tones with one of the tones in the individual frequency pair being at the image frequency of the other tone in the individual frequency pair, said second set of frequency pairs including a third tone at a third frequency and a fourth tone at a fourth frequency which is an image frequency of said third frequency; and means, implemented in hardware, for wirelessly receiving information in said second OFDM symbol, said information being communicated only on said selected second set of frequency pairs.

6. The wireless terminal of claim 5,
wherein said first set of frequency pairs includes less than all of the frequency pairs in said first OFDM symbol.

7. The wireless terminal of claim 5, wherein said means for selecting said second set of frequency pairs include means, implemented in hardware, for using a tone hopping function to select said second set of frequency pairs.

8. The wireless terminal of claim 5,
wherein said selection is based on a connection identifier or a device identifier.

9. A wireless terminal, comprising:
at least one processor configured to:
 select, at the wireless terminal and for use with a communications peer in a peer to peer communications session, a first set of frequency pairs in a first OFDM symbol to use simultaneously for transmission purposes, each individual frequency pair in said first set of frequency pairs including a pair of tones with one of the tones in the individual frequency pair being at the image frequency of the other tone in the individual frequency pair, said first set of frequency pairs including at least a first tone at a first frequency and a second tone at a second frequency which is an image frequency of said first frequency;
 transmit, at the wireless terminal, information in said first OFDM symbol using only said selected first set of frequency pairs;
 select a second set of frequency pairs in a second OFDM symbol to use simultaneously for receiving information from a communications peer in a peer to peer communications session, each individual frequency pair in said second set of frequency pairs including a pair of tones with one of the tones in the individual frequency pair being at the image frequency of the other tone in the individual frequency pair, said second set of frequency pairs including a third tone at a third frequency and a fourth tone at a fourth frequency which is an image frequency of said third frequency; and
 receive information in said second OFDM symbol, said information being communicated only on said selected second set of frequency pairs; and
memory coupled to said at least one processor.

10. The wireless terminal of claim 9,
wherein said first set of frequency pairs includes less than all of the frequency pairs in said first OFDM symbol.

11. The wireless terminal of claim 9, wherein said at least one processor is further configured to use a tone hopping function to select said second set of frequency pairs.

12. The wireless terminal of claim 9,
wherein said selection is based on a connection identifier or a device identifier.

13. A computer program product for use in a wireless terminal, comprising:
non-transitory computer readable medium comprising:
 code for causing at least one computer to select, at the wireless terminal and for use with a communications peer in a peer to peer communications session, a first set of frequency pairs in a first OFDM symbol to use simultaneously for transmission purposes, each individual frequency pair in said first set of frequency pairs including a pair of tones with one of the tones in the individual frequency pair being at the image frequency of the other tone in the individual frequency pair, said first set of frequency pairs including at least a first tone at a first frequency and a second tone at a second frequency which is an image frequency of said first frequency;

code for causing the at least one computer to transmit, at the wireless terminal, information in said first OFDM symbol using only said selected first set of frequency pairs;

code for causing the at least one computer to select a second set of frequency pairs in a second OFDM symbol to use simultaneously for receiving information from a communications peer in a peer to peer communications session, each individual frequency pair in said second set of frequency pairs including a pair of tones with one of the tones in the individual frequency pair being at the image frequency of the other tone in the individual frequency pair, said second set of frequency pairs including a third tone at a third frequency and a fourth tone at a fourth frequency which is an image frequency of said third frequency; and code for causing the at least one computer to receive information in said second OFDM symbol, said information being communicated only on said selected second set of frequency pairs.

14. The computer program product of claim 13, wherein the first set of frequency pairs includes less than all of the frequency pairs in said first OFDM symbol.

15. The computer program product of claim 13, wherein said selection is based on a connection identifier or a device identifier.

* * * * *